(12) United States Patent
Richard et al.

(10) Patent No.: US 12,110,957 B2
(45) Date of Patent: Oct. 8, 2024

(54) GLOBOID WORM GEAR

(71) Applicant: ILLINOIS TOOL WORKS INC., Glenview, IL (US)

(72) Inventors: Didier Richard, Marignier (FR); Lionel Martin, Sallanches (FR)

(73) Assignee: ILLINOIS TOOL WORKS INC., Glenview, IL (US)

( * ) Notice: Subject to any disclaimer, the term of this patent is extended or adjusted under 35 U.S.C. 154(b) by 27 days.

(21) Appl. No.: 17/913,746

(22) PCT Filed: Mar. 16, 2021

(86) PCT No.: PCT/US2021/022471
§ 371 (c)(1),
(2) Date: Sep. 22, 2022

(87) PCT Pub. No.: WO2021/194794
PCT Pub. Date: Sep. 30, 2021

(65) Prior Publication Data
US 2023/0102311 A1    Mar. 30, 2023

(30) Foreign Application Priority Data

Mar. 26, 2020 (EP) .................................... 20165830
Mar. 2, 2021 (EP) .................................... 21160313

(51) Int. Cl.
*F16H 55/22* (2006.01)
*F16H 1/16* (2006.01)

(52) U.S. Cl.
CPC .............. *F16H 55/22* (2013.01); *F16H 1/16* (2013.01)

(58) Field of Classification Search
None
See application file for complete search history.

(56) References Cited

U.S. PATENT DOCUMENTS 2,448,187 A    8/1948  Morgan
3,516,298 A *  6/1970  Frans ...................... F16H 55/22
                                                        74/427

(Continued)

FOREIGN PATENT DOCUMENTS

DE         1027032 B      3/1958
DE    102011050261 A1    11/2012

(Continued)

OTHER PUBLICATIONS

International Searching Authority, International Search Report and Written Opinion, International Application No. PCT/US2021/022471 mailed Jul. 8, 2021, 13 pages.

*Primary Examiner* — Vicky A Johnson
(74) *Attorney, Agent, or Firm* — THOMPSON HINE LLP

(57) ABSTRACT

The present disclosure relates to a globoid worm gear (4) for engagement with a worm (3) in a worm gear assembly (1). The globoid worm gear (4) includes first and second side surfaces (17, 18), a circumferential surface (10), and an axis of rotation. The globoid worm gear (4) also includes a plurality of gear teeth (9) spaced about the circumferential surface (10) with spaces (11) arranged between adjacent gear teeth (9), the plurality of gear teeth (9) being configured to engage the worm (3). The plurality of gear teeth (9) are configured such that the spaces (11) between adjacent gear teeth (9) open into the first side surface (17).

12 Claims, 7 Drawing Sheets

(56) References Cited

U.S. PATENT DOCUMENTS 5,018,403 A * 5/1991 Umezono ................. F16H 1/16
                                                                              409/48
7,806,016 B2 * 10/2010 Shimizu ............... B62D 5/0409
                                                                              74/425

FOREIGN PATENT DOCUMENTS

| DE | 102014104284 A1 | 10/2015 |
|----|-----------------|---------|
| DE | 102016222115 A1 | 5/2018  |
| JP | 2008055649 A    | 3/2008  |

* cited by examiner

GLOBOID WORM GEAR

TECHNICAL FIELD OF INVENTION

The invention relates to a globoid worm gear for engagement with a worm in a worm gear assembly, and to a gear assembly including a globoid worm gear and a worm.

BACKGROUND

A globoid worm gear assembly includes a worm and a globoid worm gear that is rotated by the worm. The worm includes one or more helical gear teeth that engage gear teeth of the globoid worm gear to transfer rotation. The worm and the globoid worm gear rotate about perpendicular axes of rotation.

A globoid worm gear is shaped to increase the surface area of its gear teeth compared to a conventional worm gear. This provides for decreased contact pressure and an increased number of gear teeth in engagement, which reduces gear wear and increases transmissible torque.

Assembly of such a globoid worm gear assembly is limited because it is not possible for the worm to be assembled on a housing before the globoid worm gear, and for the globoid worm gear to be engaged with the worm by moving it in an axial direction into the housing due to interference between the worm and the globoid worm gear.

SUMMARY

According to the present invention, there is provided a globoid worm gear for engagement with a worm in a worm gear assembly. The globoid worm gear comprises first and second side surfaces, a circumferential surface, and an axis of rotation. The globoid worm gear also comprises a plurality of gear teeth spaced about the circumferential surface with spaces arranged between adjacent gear teeth, the plurality of gear teeth being configured to engage the worm. The plurality of gear teeth are configured such that the spaces between adjacent gear teeth open into the first side surface. Such a globoid worm gear may be termed an open or semi-open globoid worm gear.

In examples, edges of the plurality of gear teeth at the first side surface each comprise a chamfer. Additionally or alternatively, edges of the spaces at the first side surface each comprise a chamfer. In particular, an edge of the first side surface may comprise a chamfer, the edge incorporating the edges of the plurality of gear teeth at the first side surface, and the edges of the spaces at the first side surface.

There is also provided a worm gear assembly comprising the globoid worm gear described above, a worm, and a housing comprising a recess shaped to receive the globoid worm gear. The globoid worm gear and the worm are mounted to the housing for rotation about perpendicular axes of rotation and such that the worm engages the gear teeth of the globoid worm gear.

There is also provided a method of assembling the worm gear assembly. The method comprises mounting the worm to the housing and then mounting the globoid worm gear to the housing by inserting the globoid worm gear into the recess in an axial direction of the globoid worm gear. In particular, the method comprises inserting an open or semi-open globoid worm gear into the recess in an axial direction of the globoid worm gear.

BRIEF DESCRIPTION OF THE DRAWINGS

Example embodiment(s) of the invention are illustrated in the accompanying drawings, in which.

DESCRIPTION

The illustrated example embodiments relate to a globoid worm gear for engagement with a worm in a worm gear assembly.

Figure 1:
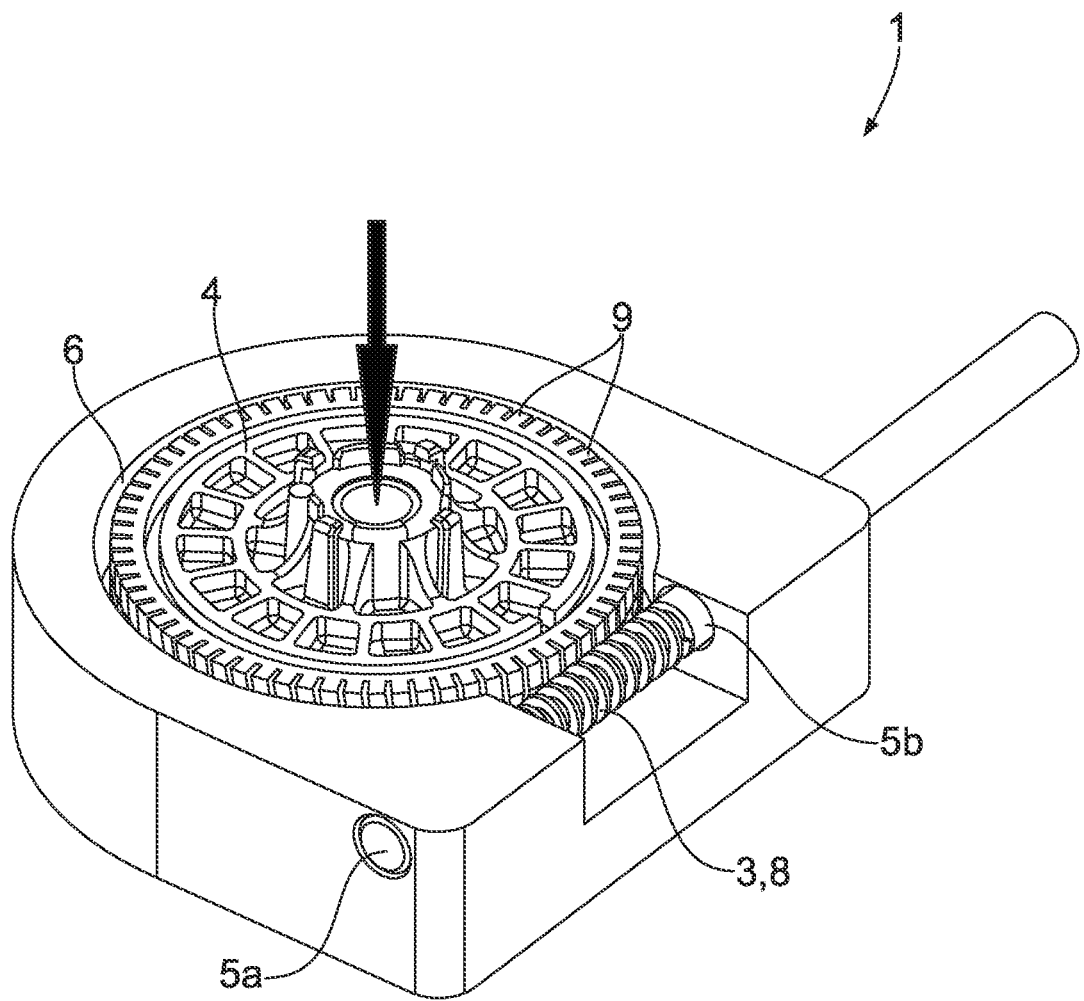
FIG. 1 illustrates a perspective view of a worm gear assembly.

The worm gear assembly 1 shown in FIG. 1 includes a housing 2, a worm 3, and a globoid worm gear 4. The housing 2 includes a recess 6 in which the globoid worm gear 4 is seated. The housing 2 also includes a mount (7, see FIG. 2) to which the globoid worm gear 4 is rotationally mounted, for example a hole as illustrated, or alternatively a shaft. The housing 2 also includes mount portions 5a, 5b for rotationally mounting the worm 3 such that the worm 3 extends across one side of the recess 6. In the assembled state shown in FIG. 1, the worm 3 engages the globoid worm gear 4. Rotation of the worm 3 thereby drives rotation of the globoid worm gear 4. An axis of rotation of the worm 3 is perpendicular to an axis of rotation of the globoid worm gear 4.

The worm 3 includes one or more helical gear teeth 8 on a circumferential surface. The globoid worm gear 4 includes a plurality of gear teeth 9 arranged to engage the helical gear teeth 8 of the worm 3. In particular, as shown in FIG. 1, the mount (7, see FIG. 2) for the globoid worm gear 4 and the mount portions 5a, 5b for the worm 3 are arranged such that the worm 3 engages the globoid worm gear 4 such that rotation of the worm 3 drives rotation of the globoid worm gear 4.

Figure 2:
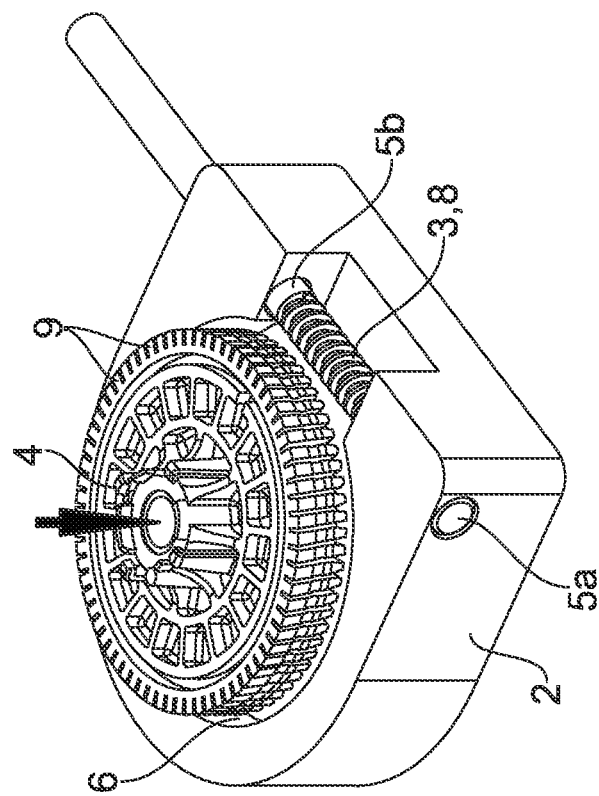
FIG. 2 illustrates perspective view the worm gear assembly of FIG. 1 being assembled.
Figure 2:
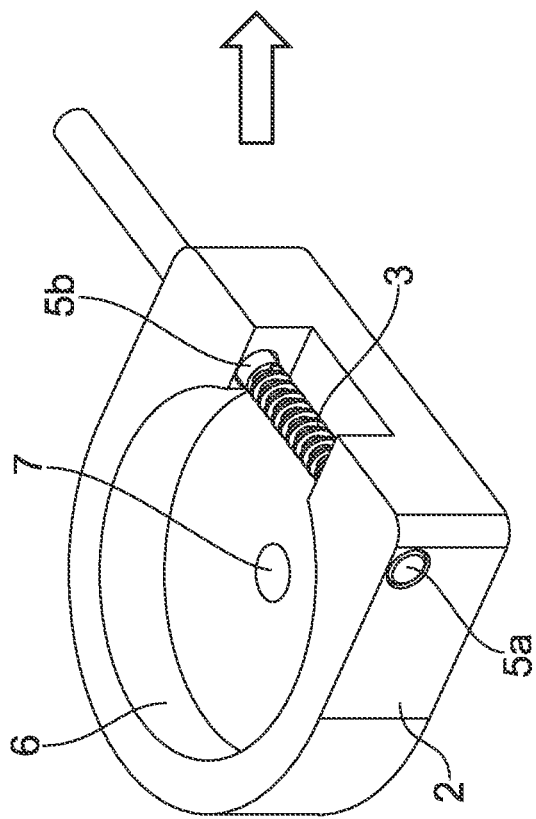

As shown in FIG. 2, in a preferred method of assembling the worm gear assembly 1 the worm 3 is mounted to the housing 2, in particular via mount portions 5a, 5b, and then the globoid worm gear 4 is attached to the housing 2, in particular at the mount 7, by inserting the globoid worm gear 4 into the recess 6 in an axial direction of the globoid worm gear 4. The globoid worm gear 4 may be pressed into the recess 6.

As shown, the recess 6 is preferably configured to closely surround the circumferential face of the globoid worm gear 4 with only a small spacing between the surface of the recess 6 and the gear teeth 9 of the globoid worm gear 4. In particular, the recess 6 is cylindrical with an opening at one end to accommodate the worm 3.

In alternative examples, the worm 3 may be rotationally mounted to the housing 2 at a single mount point, for example mount point 5a. The globoid worm gear 4 may comprise a spigot or shaft to engage the mount 7 in the form of a hole, as illustrated, or the mount 7 of the housing 2 may include a shaft or spigot for mounting the globoid worm gear 4. The housing 2 may comprise two parts that are assembled with the worm 3 in between to facilitate assembly of the housing 2 and the worm 3.

The worm gear assembly 1 may include one or more bearings or bushings for the worm 3 and/or the globoid worm gear 4. Alternatively, the housing 2 and/or the worm 3 and/or a shaft or spigot of the globoid worm gear 4 may comprise a low friction or self-lubricating material, for example a polyamide such as Nylon, or a polyoxymethylene. In some examples, the globoid worm gear 4 may be made of a self-lubricating material, for example a polyamide such as Nylon, or a polyoxymethylene.

In a final configuration the globoid worm gear 4 is coupled to a further component, not illustrated, such that the further component is rotated by the globoid worm gear 4 when the worm 3 is rotated. For example, the globoid worm gear 4 may be coupled to a windscreen wiper for actuating the windscreen wiper, or to a window lift system for opening and closing a window. Accordingly, the worm gear assembly 1 may be an automotive worm gear assembly.

Figure 3A:
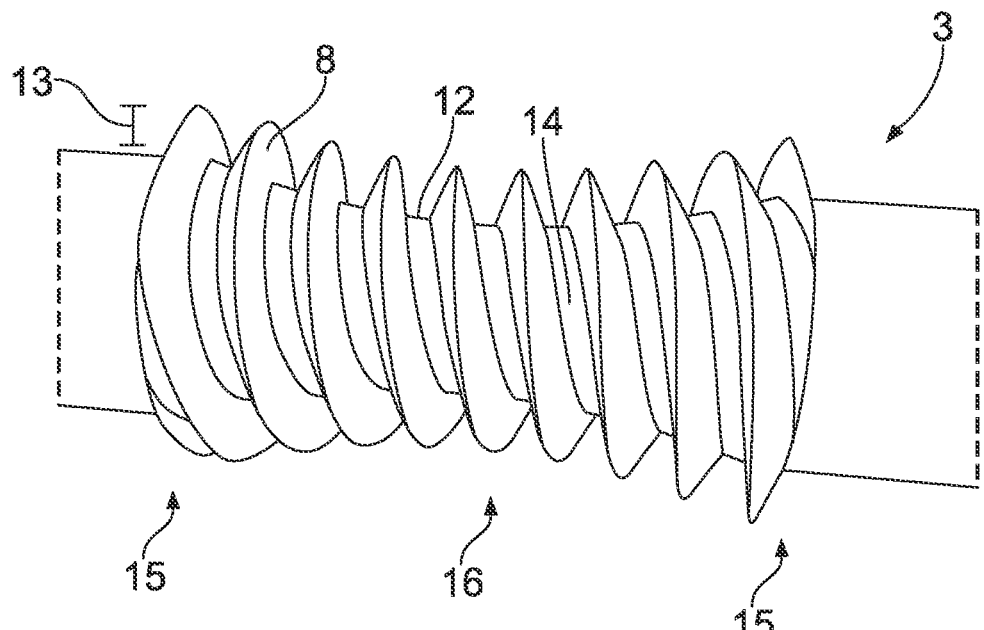
FIG. 3A illustrates a globoid worm of the worm gear assembly of FIG. 1.

FIG. 3A shows a first example of the worm 3 of the worm gear assembly 1. In this example, the worm 3 is a globoid worm 3. The globoid worm 3 comprises one or more helical gear teeth 8 on a circumferential surface 12 of the globoid worm 3, for example one, two or three helical gear teeth 8. In contrast to a conventional worm (see FIG. 3B), a depth of the helical gear teeth 8 of the globoid worm 3 varies along the length of the globoid worm 3. In particular, the depth 13 of the helical gear teeth 8 is greater at the ends 15 of the helical gear teeth 8 than in the centre 16. In this way, the helical gear teeth 8 conform to the circumference of the globoid worm gear 4 to increase contact surface area between the helical gear teeth 8 and the gear teeth 9 of the globoid worm gear 4. Additionally, the diameter of the shaft 14 of the globoid worm 3, from which the helical gear teeth 8 protrude, may be reduced in the centre 16 in the same manner, as illustrated.

Figure 3B:
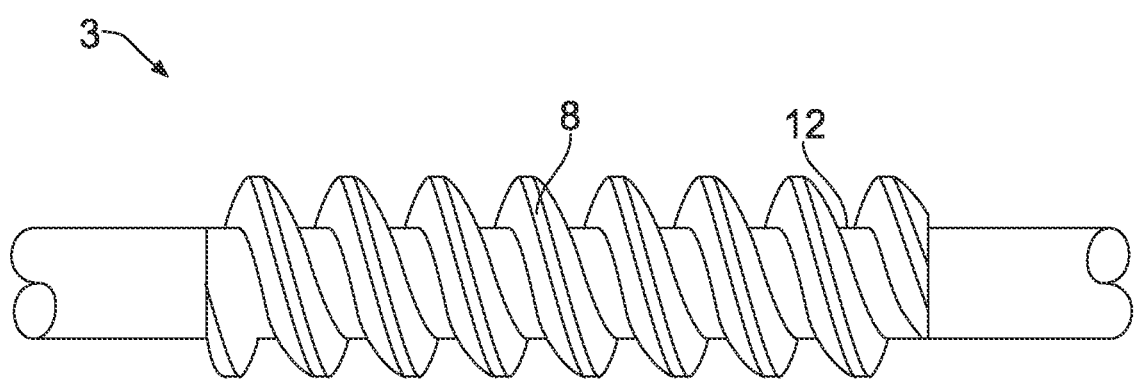
FIG. 3B illustrates a conventional worm of the worm gear assembly of FIG. 1.

FIG. 3B shows an alternative example of the worm 3 of the worm gear assembly 1. In this example, the worm 3 is a conventional worm 3. The conventional worm 3 comprises one or more helical gear teeth 8 on a circumferential surface 12 of the conventional worm 3, for example one, two or three helical gear teeth 8. In contrast to the globoid worm (see FIG. 3a), a depth of the helical gear teeth 8 of the conventional worm 3 remains constant along the length of the conventional worm 3.

It will be appreciated that either a globoid worm 3 (see FIG. 3A) or a conventional worm 3 (see FIG. 3B) may be used in the worm gear assembly 1 illustrated in FIG. 1. Preferably, the worm 3 is a conventional worm 3, as illustrated in FIG. 3B, as a conventional worm 3 is easier to manufacture and less expensive than a globoid worm, as illustrated in FIG. 3A.

FIGS. 4 to 7 illustrate different examples of the globoid worm gear 4 for the worm gear assembly 1 described above. In each of the examples of FIGS. 4 to 7, the globoid worm gear 4 comprises first and second surfaces 17, 18, in particular a front surface 17 and a back surface 18. The globoid worm gear 4 also includes a circumferential surface 10 that extends between the first and second surfaces 17, 18. The globoid worm gear 4 comprises a plurality of gear teeth 9 spaced about the circumferential surface 10 of the globoid worm gear 4. Spaces 11 are arranged between the gear teeth 9.

Figure 4:
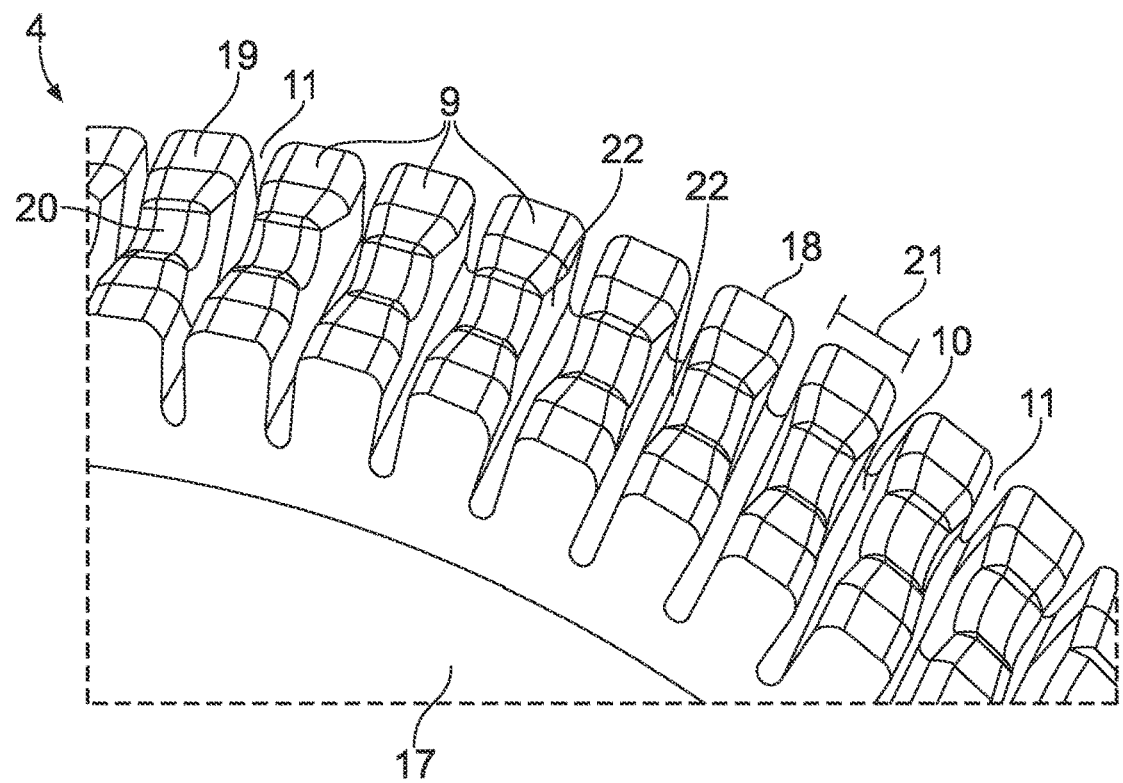
FIG. 4 illustrates a first example globoid worm gear of the worm gear assembly of FIG. 1.

In the example of FIG. 4, each space 11 extends to both the front and back surfaces 17, 18 of the globoid worm gear 4 such that the spaces 11 open into the front and back surfaces 17, 18. This allows the globoid worm gear 4 to be engaged with the worm 3 by moving the globoid worm gear 4 in an axial direction, as illustrated in FIG. 2. In particular, as the spaces 11 open into the front and back surfaces 17, 18, the helical gear tooth 8 of the worm 3 can enter the spaces 11 between the gear teeth 9 as the globoid worm gear 4 is moved axially.

A further advantage of the spaces 11 opening into the front and back surfaces 17, 18 is that the globoid worm gear 4 can be more simply moulded, in particular injection moulded, because fewer sliding cores are required to form the gear teeth 9 about the circumferential surface 10.

As also illustrated in FIG. 4, each gear tooth 9 has a top surface 19 that includes a recess 20. The recesses 20 are arranged centrally in the gear teeth 9 and configured to align with, and accommodate, the shaft 14 of the worm 3 (see FIGS. 3A and 3B). Ibis allows a closer spacing between the worm 3 and the globoid worm gear 4, increasing the contact surface area between the helical gear tooth 8 of the worm 3 and the gear teeth 9 of the globoid worm gear 4.

As also illustrated in FIG. 4, preferably a tooth width 21 of each gear tooth 9 (i.e. the thickness of the tooth 9 in a circumferential direction) is thinner in the centre than towards the opposing surfaces 17, 18 of the globoid worm gear 4. In particular, the side surfaces 22 of each gear tooth 9 are concave. Such a configuration improves contact surface area between the helical gear tooth 8 of the worm 3 and the gear teeth 9 of the globoid worm gear 4.

Figure 5:
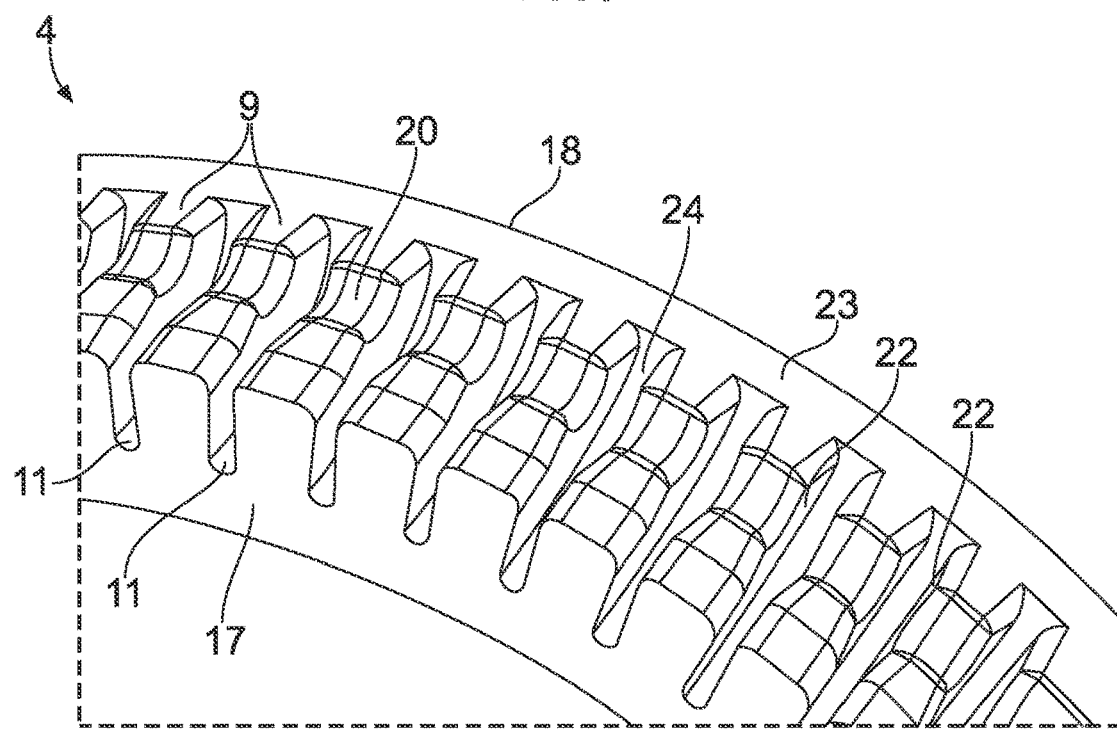
FIG. 5 illustrates a second example globoid worm gear of the worm gear assembly of FIG. 1.

In the example of FIG. 5 the globoid worm gear 4 includes a flange 23 on the back face 18. The flange 23 may be an integrally moulded part of the globoid worm gear 4, or attached to the globoid worm gear 4. As such, the spaces 11 between the gear teeth 9 do not open onto the back face 18 of the globoid worm gear 4. The spaces 11 between the gear teeth 9 do open onto the front face 17 of the globoid worm gear 4, allowing axial assembly of the globoid worm gear 4 into the housing 2 via the front face 17, as described with reference to FIG. 2.

In the example of FIG. 5, where the spaces 11 are closed by the flange 23 on one side, the globoid worm gear 4 is a semi-globoid worm gear.

As illustrated in FIG. 5, the root surfaces 24 in the spaces 11 between gear teeth 9 are curved upwards (i.e. curved in a radially outward direction) towards the flange 23. The flange 23 and the curved root surfaces 24 increase the strength of the gear teeth 9.

In the example of FIG. 5 the gear teeth 9 have the recesses 20 and concave side surfaces 22 described with reference to FIG. 4. However, it will be appreciated that each of these features is optional in combination with the flange 23 and curved root surfaces 24.

Figure 6:
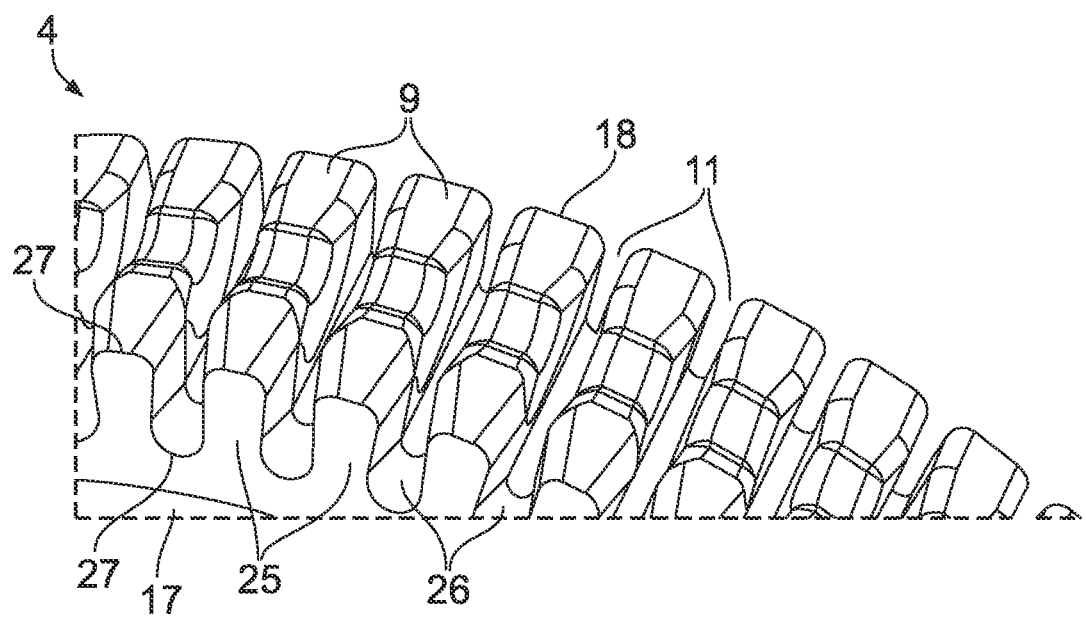
FIG. 6 illustrates a third example globoid worm gear of the worm gear assembly of FIG. 1.

In the example of FIG. 6, a front edge 27 of the globoid worm gear 4 has a chamfer 26. In particular, a front end 25 of each gear tooth 9 comprise a chamfer 26 that tapers towards the front surface 17 of the globoid worm gear 4. Additionally or alternatively, the edges of the spaces 11 at the front surface 17 each comprise a chamfer 26 that tapers towards the front surface 17 of the globoid worm gear 4. The chamfer 26 makes it easier for the globoid worm gear 4 to engage the worm 3 during assembly of the gear assembly 1 as illustrated in FIG. 2. In particular, the chamfer 26 guides the helical gear tooth 8 of the worm 3 into the spaces 11 between the gear teeth 9, and may additionally cause deformation of the gear teeth 9 as the globoid worm gear 4 is pressed into the housing 2 as shown in FIG. 2, to allow the helical gear tooth 8 to enter the space 11.

Preferably, the gear teeth 9 (in particular the side surfaces 22), spaces 11, and front edge 27 of the globoid worm gear 4 are configured such that the helical gear tooth 8 of the worm 3 must be pressed into the spaces 11 to overcome interference between the helical gear tooth 9 and the gear teeth 9 before clicking into the spaces between the concave side surfaces 22 of the gear teeth 9. In this way, the gear assembly 1 of FIG. 1 can be assembled by pressing the globoid worm gear 4 into the housing 2 to engage the worm 3, and the interference prevents the globoid worm gear 4 from falling out of position during further assembly operations, which may include inverting the gear assembly 1 illustrated in FIG. 1. The interference also provides for a close fit between the gear teeth 9 of the globoid worm gear 4 and the helical gear tooth 8 of the worm 3, reducing backlash and increasing contact surface area during use.

In the example of FIG. 6 the gear teeth 9 have the recesses 20 and concave side surfaces 22 described with reference to FIG. 4. However, it will be appreciated that each of these features is optional in combination with the chamfer 26. In addition, the globoid worm gear 4 described with reference to FIG. 5 may additionally include the chamfer 26 illustrated in FIG. 6.

Figure 7:
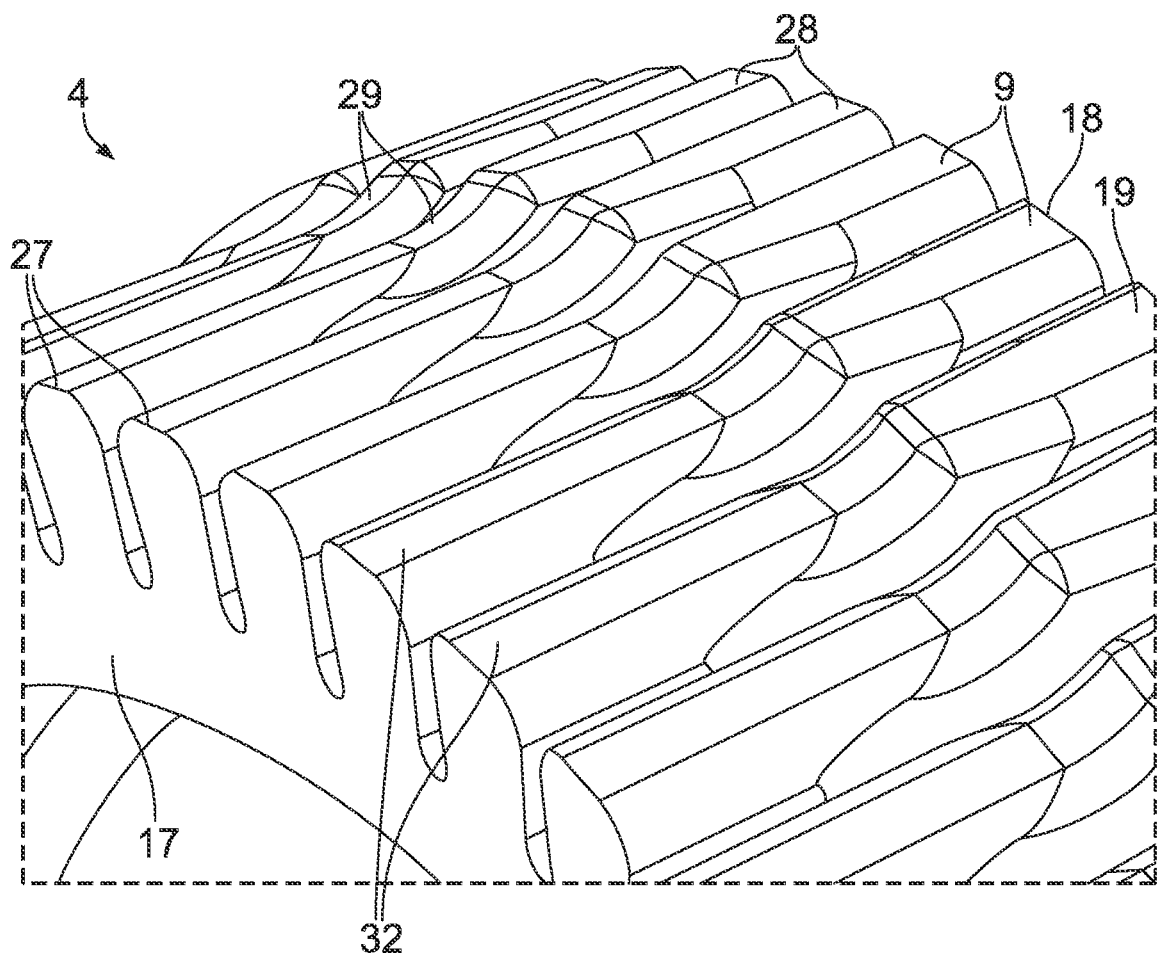
FIG. 7 illustrates a fourth example globoid worm gear of the worm gear assembly of FIG. 1.

In the example of FIG. 7, the top surface 19 each gear tooth 9 comprises a first portion 32 adjacent the front face 17 and a second portion 28 adjacent the back face 18. The second portion 28 has a greater diameter than the first portion 32, resulting in a step, or preferably a ramp 29, between the first and second portions 32, 28.

The lower diameter of the first portions 32 permits axial assembly of the globoid worm gear 4 with the worm 3 and housing 2 in the manner described with reference to FIG. 2. In particular, the lower diameter of the first portion 32 reduces or eliminates interference between the helical gear tooth 8 of the worm 3 and the gear teeth 9 of the globoid worm gear 4 that might otherwise prevent the helical gear tooth 8 entering the spaces 11 to engage, and also allows the shaft 14 of the worm 3 to move into position. The second portions 28 provide greater contact surface area between the helical gear tooth 8 of the worm 3 and the gear teeth 9 of the globoid worm gear 4. This increases contact surface area and improves torque transmission, and also increases the rigidity of the gear teeth 9.

In some examples, the first portions 32 may be at the diameter of the recesses 20 described with reference to FIG. 4 so that there is no need for the recesses 20. In such an example, the globoid worm gear 4 is a semi-globoid worm gear. Alternatively, the gear teeth 9 of the example of FIG. 7 may additionally include recesses 20 such as those described with reference to FIG. 4.

In the example of FIG. 7 the gear teeth 9 may optionally include the concave side surfaces 22 described with reference to FIG. 4. Additionally or alternatively, the globoid worm gear 4 may include a flange 23 and/or curved root surface 24 as described with reference to FIG. 5, and/or the chamfer 26 described with reference to FIG. 6.

Figure 8:
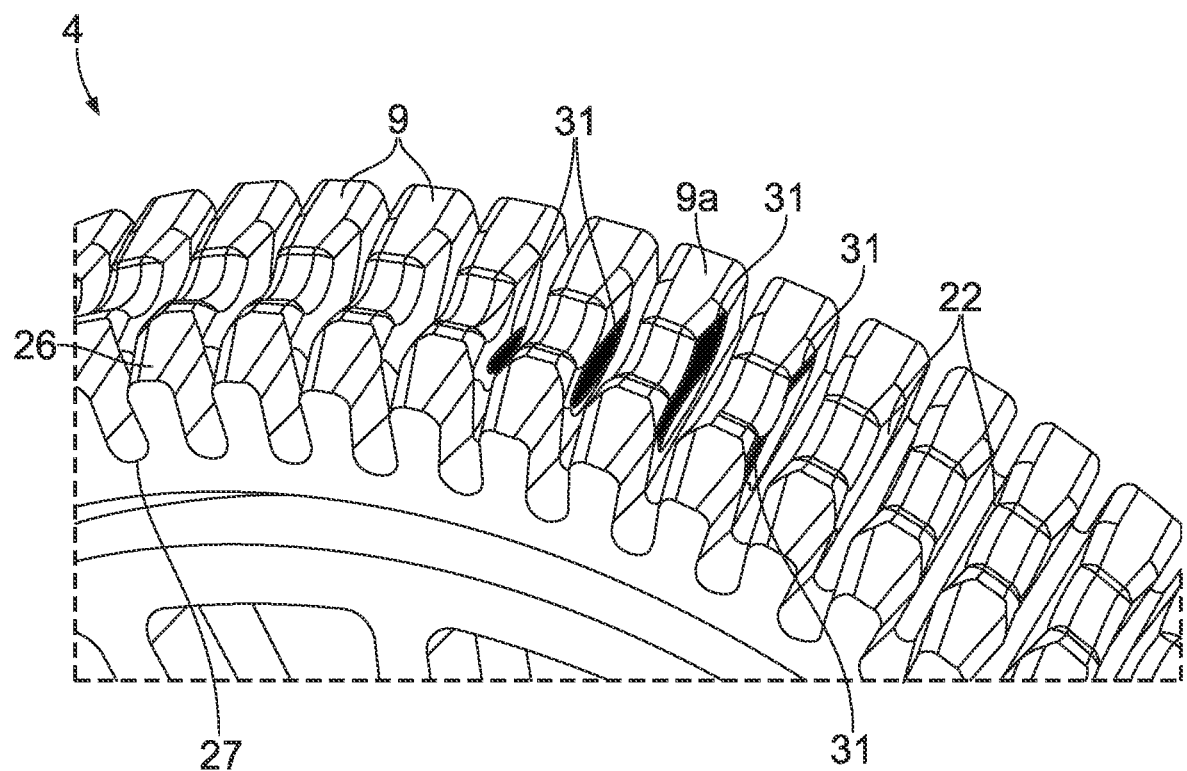
FIG. 8 illustrates an example globoid worm gear of the worm gear assembly of FIG. 1, showing contact surfaces with the globoid worm.

FIG. 8 illustrates an example globoid worm gear 4 and indicates the contact points of the helical gear tooth 8 of the worm 3 of the gear assembly illustrated in FIG. 1. As shown, the globoid worm gear 4 includes gear teeth 9 that include concave side surfaces 22 and a chamfer 26 on the front edge 27, as described with reference to FIGS. 4 and 6.

As shown in FIG. 8, the concave side surfaces 22 are engaged by the helical gear tooth 8 across the concave parts of the side surfaces 22. Regions 31 of the gear teeth 9, as illustrated in FIG. 8, are engaged by the helical gear tooth 8 of the worm 3.

In this example, four gear teeth 9 are engaged simultaneously, and at maximum engagement (gear tooth 9a as indicated) approximately the entire concave part of the side surface 22 is engaged. Therefore, the concave side surfaces 22 of the gear teeth 9 increase contact surface area between the helical gear tooth 8 of the worm 3 and the gear teeth 9 of the globoid worm gear 4, which improves torque transfer.

Figure 9:
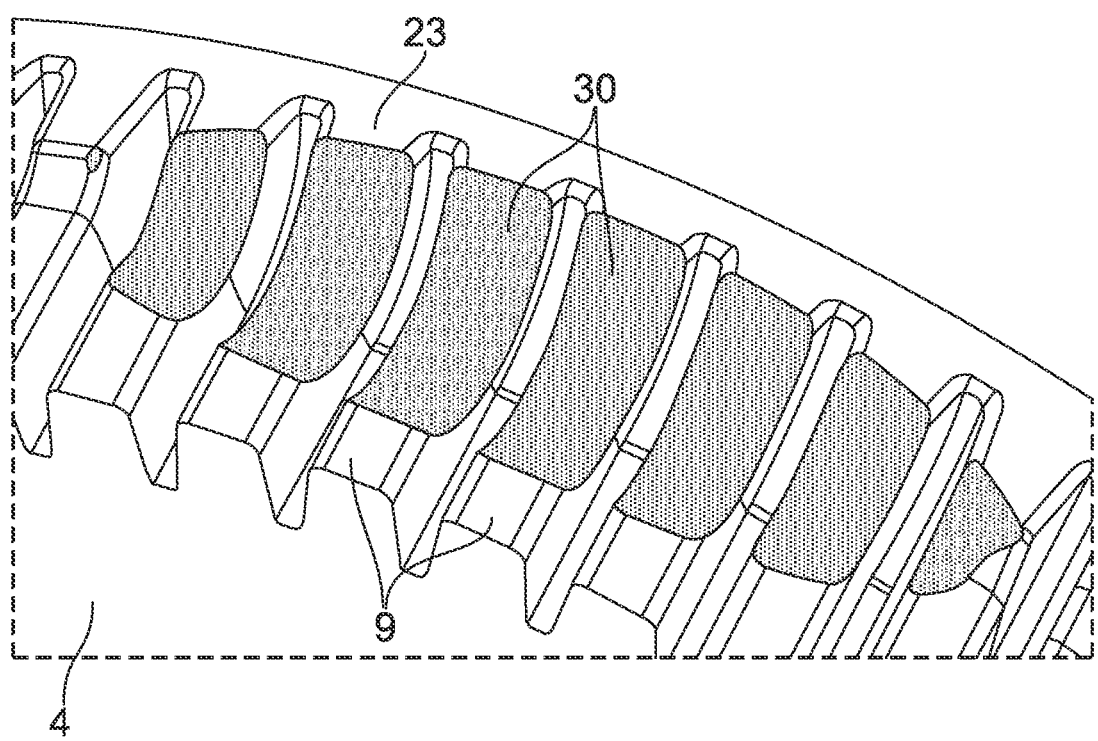
FIG. 9 illustrates the gear tooth shear stress distribution of an example globoid worm gear of the worm gear assembly of FIG. 1.
Figure 10:
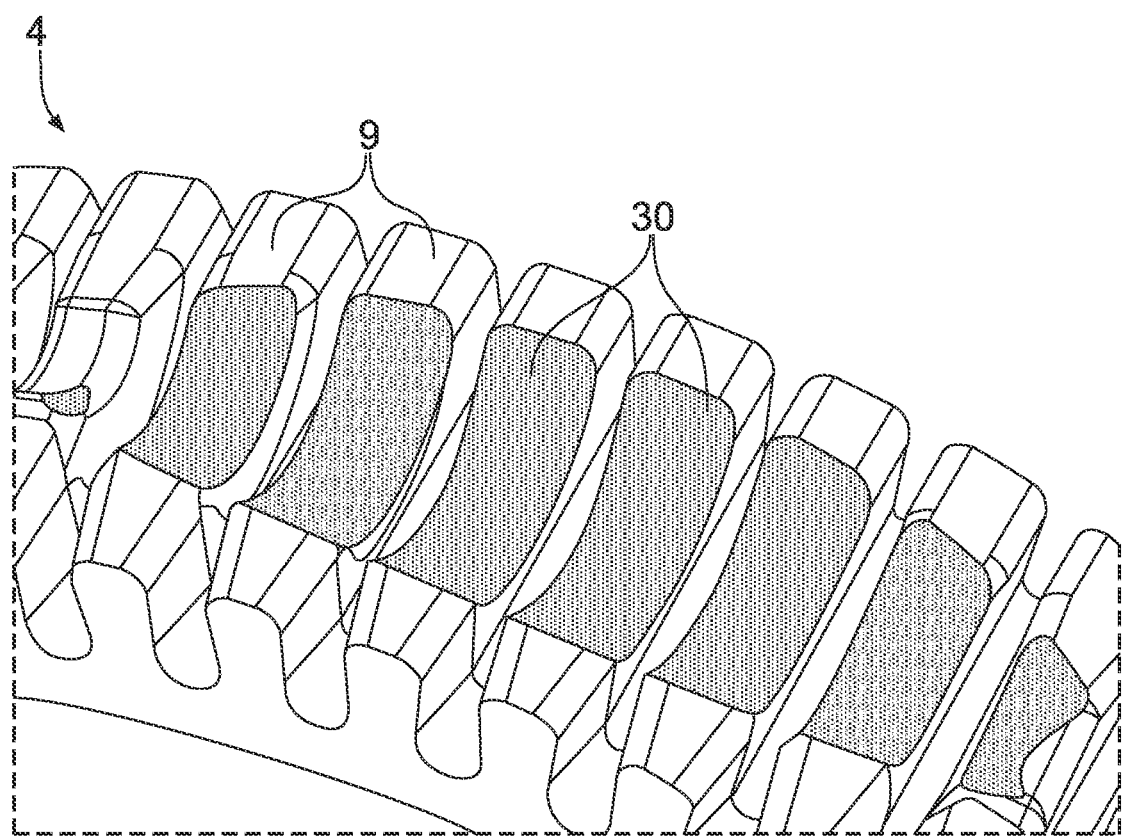
FIG. 10 illustrates the gear tooth shear stress distribution of another example globoid worm gear of the worm gear assembly of FIG. 1.

FIG. 9 illustrates the gear teeth section subjected to shear stress 30 in the gear teeth 9 of the globoid worm gear 4 of FIG. 5. FIG. 10 illustrates the gear teeth section subjected to shear stress 30 in the gear teeth 9 of the globoid worm gear 4 of FIG. 6.

As illustrated, the shear stress is distributed over a larger surface area 30 in the globoid worm gear 4 of FIG. 6 than for the semi-globoid worm gear 4 of FIG. 5. The surface area 30 over which the shear force is distributed in increased, reducing the maximum shear stress on each gear tooth 9 and prolonging the life of the globoid worm gear 4.

Preferably, the gear teeth 9 of the globoid worm gear 4 are helical, although the helix angle is very low.

In summary, there is provided a globoid worm gear 4 for engagement with a globoid worm 3 in a worm gear assembly 1. The globoid worm gear 4 has first and second side surfaces 17, 18, a circumferential surface 10, and an axis of rotation. The globoid worm gear 4 also includes a plurality of gear teeth 9 spaced about the circumferential surface 10 with spaces 11 arranged between adjacent gear teeth 9. The plurality of gear teeth 9 are configured to engage the globoid worm 3. The plurality of gear teeth 9 are configured such that the spaces 11 between adjacent gear teeth 9 open into the first side surface 17.

There is also provided a worm gear assembly that includes the globoid worm gear 4. The worm gear assembly 1 includes a housing 2, a globoid worm 3, and the globoid worm gear 4. The globoid worm gear 4 and the globoid worm 3 are mounted to the housing 2 for rotation about perpendicular axes of rotation and such that the globoid worm 3 engages the gear teeth 9 of the globoid worm gear 4.

There is also provided a method of assembling the worm gear assembly 1 described above. The method includes first mounting the worm 3 to the housing 2 and then mounting the globoid worm gear 4 to the housing 2 by inserting the globoid worm gear 4 into the recess 6 in an axial direction of the globoid worm gear 4. As the globoid worm gear 4 is inserted into the housing 2 the gear teeth 9 of the globoid worm gear 4 engage the gear tooth or teeth of the worm 3.

The invention claimed is:

1. A globoid worm gear for engagement with a worm in a worm gear assembly, the globoid worm gear comprising:
   first and second end surfaces, a circumferential surface, and an axis of rotation; and
   a plurality of gear teeth spaced about the circumferential surface with spaces arranged between adjacent gear teeth, the plurality of gear teeth being configured to engage the worm;
   wherein the plurality of gear teeth are configured such that the spaces between adjacent gear teeth open into the first end surface;

wherein each of the plurality of gear teeth comprises a radially outer top surface having an end region adjacent the first end surface, wherein the end region comprises a chamfer that slopes radially inward toward the axis of rotation when moving along the chamfer in a direction toward the first end surface.

2. The globoid worm gear of claim 1, wherein edges of the spaces at the first end surface each comprise a chamfer.

3. The globoid worm gear of claim 1, wherein each of the plurality of gear teeth comprises concave side surfaces to engage the worm.

4. The globoid worm gear of claim 1, wherein the gear teeth are configured such that the spaces between adjacent gear teeth extend the second end surface.

5. The globoid worm gear of claim 1, where the gear teeth are configured such that the spaces between adjacent gear teeth extend to only the first end surface, the second end surface comprising a flange that closes the ends of the spaces between adjacent gear teeth.

6. The globoid worm gear of claim 5, wherein each space between adjacent gear teeth comprises a root surface that is curved in a radially outward direction of the globoid worm gear towards the flange.

7. The globoid worm gear of claim 5, wherein each of the plurality of gear teeth comprises a top surface, wherein each top surface comprises a first portion adjacent to the first end surface and a second portion adjacent to the second end surface, and wherein a radius of the second portion from the axis of rotation is greater than a radius of the first portion from the axis of rotation.

8. The globoid worm gear of claim 1, wherein the globoid worm gear is configured to engage with a conventional worm or a globoid worm.

9. A worm gear assembly comprising the globoid worm gear of claim 1, a worm, and a housing comprising a recess shaped to receive the globoid worm gear, and wherein the globoid worm gear and the worm are mounted to the housing for rotation about perpendicular axes of rotation and such that the worm engages gear teeth of the globoid worm gear.

10. A method of assembling the worm gear assembly of claim 9, comprising mounting the worm to the housing and then mounting the globoid worm gear to the housing by inserting the globoid worm gear into the recess in an axial direction of the globoid worm gear.

11. A globoid worm gear for engagement with a worm in a worm gear assembly, the globoid worm gear comprising:
first and second end surfaces, a circumferential surface, and an axis of rotation; and
a plurality of gear teeth spaced about the circumferential surface with spaces arranged between adjacent gear teeth, the plurality of gear teeth being configured to engage the worm;
wherein the plurality of gear teeth are configured such that the spaces between adjacent gear teeth open into the first end surface;
where the gear teeth are configured such that the spaces between adjacent gear teeth extend to only the first end surface, the second end surface comprising a flange that closes the ends of the spaces between adjacent gear teeth;
wherein each space between adjacent gear teeth comprises a root surface that is curved in a radially outward direction of the globoid worm gear towards the flange.

12. A globoid worm gear for engagement with a worm in a worm gear assembly, the globoid worm gear comprising:
first and second end surfaces, a circumferential surface, and an axis of rotation; and
a plurality of gear teeth spaced about the circumferential surface with spaces arranged between adjacent gear teeth, the plurality of gear teeth being configured to engage the worm;
wherein the plurality of gear teeth are configured such that the spaces between adjacent gear teeth open into the first end surface;
wherein each of the plurality of gear teeth comprises a top surface, wherein each top surface comprises a first portion adjacent to the first end surface and a second portion adjacent to the second end surface, and wherein a radius of the second portion from the axis of rotation is greater than a radius of the first portion from the axis of rotation.

* * * * *